US007496504B2

(12) United States Patent
Lee et al.

(10) Patent No.: US 7,496,504 B2
(45) Date of Patent: Feb. 24, 2009

(54) METHOD AND APPARATUS FOR SEARCHING FOR COMBINED FIXED CODEBOOK IN CELP SPEECH CODEC

(75) Inventors: Eung Don Lee, Daejeon (KR); Do Young Kim, Daejeon (KR); Bong Tae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1069 days.

(21) Appl. No.: 10/671,266

(22) Filed: Sep. 24, 2003

(65) Prior Publication Data

US 2004/0093203 A1 May 13, 2004

(30) Foreign Application Priority Data

Nov. 11, 2002 (KR) ...................... 10-2002-0069587

(51) Int. Cl.
*G01L 19/00* (2006.01)
*G01L 19/12* (2006.01)

(52) U.S. Cl. ........................ 704/219; 704/220; 704/223

(58) Field of Classification Search ................. 704/219, 704/220, 223

See application file for complete search history.

(56) References Cited

U.S. PATENT DOCUMENTS 4,868,867 A * 9/1989 Davidson et al. ......... 704/200.1
5,701,392 A 12/1997 Adoul et al.
5,867,814 A * 2/1999 Yong .......................... 704/216
6,173,257 B1 * 1/2001 Gao ........................... 704/220
7,096,181 B2 * 8/2006 Jung et al. .................. 704/222

OTHER PUBLICATIONS

Lan Juan et al.;"An 8-kb/s Conjugate-structure Algebraic CELP (CS-ACELP) Speech Coding"; Proceedings of ICSP '98; pp. 1729-1732, 1998.

(Continued)

*Primary Examiner*—Angela A Armstrong
(74) *Attorney, Agent, or Firm*—Blakely, Sokoloff, Taylor & Zafman LLP

(57) ABSTRACT

Provided are a combined, fixed codebook searching method and apparatus used in a code excited linear prediction (CELP) speech codec. The method is used in a code excited linear prediction (CELP) speech codec, and includes searching for a fixed codebook using a full search method that searches for the fixed codebook at all pulse positions; selecting a fixed codebook searching method by counting the number of users who are accessing a gateway, comparing the number of users with a predetermined threshold, and selecting a proper fixed codebook searching method based on the result of comparison; searching for the fixed codebook using the selected fixed codebook searching method; and checking whether the search for the fixed codebook is complete for all tracks of the CELP speech codec, terminating a routine of searching for the fixed codebook when it is determined the search is complete for all the tracks, and selecting a fixed codebook searching method again in consideration of the number of gateway users when there remains a track to be searched for. Accordingly, a fixed codebook searching method is selected in consideration of the number of users who are accessing a gateway, thereby enabling an effective adjustment of either the quality of sound or the channel capacity of the gateway.

14 Claims, 3 Drawing Sheets

OTHER PUBLICATIONS

Int'l Telecommunication Union (ITU-T) Recommendation G.729; "General Aspects of Digital Transmission Systems"/Coding of Speech at 8 kbit/s Using Conjugate-structure Algebraic-code-excited Linear-Prediction (CS-ACELP); pp. 1-35, no date.

Redwan Salami, et al.; ITU-T G.729 Annex A: Reduced Complexity 8 kb/s CS-ACELP Codec for Digital Simultaneous Voice and Data; 1997 IEEE Communications Magazine, Sep. 1997, pp. 56-63.

* cited by examiner

FIG. 1

| TRACK | PULSE | CODE | PULSE POSITION |
|---|---|---|---|
| 0 | $i_0$ | $s_0$:±1 | $m_0$:0 5 10 15 20 25 30 35 |
| 1 | $i_1$ | $s_1$:±1 | $m_1$: 1 6 11 16 21 26 31 36 |
| 2 | $i_2$ | $s_2$:±1 | $m_2$: 2 7 12 17 22 32 37 |
| 3 | $i_3$ | $s_3$:±1 | $m_1$:3 8 13 18 23 28 33 38<br>4 9 14 19 24 29 34 39 |

METHOD AND APPARATUS FOR SEARCHING FOR COMBINED FIXED CODEBOOK IN CELP SPEECH CODEC

This application claims the priority of Korean Patent Application No. 2002-69587 filed on 11 Nov. 2002, in the Korean Intellectual Property Office, the disclosure of which is incorporated herein in its entirety by reference.

BACKGROUND OF THE INVENTION

1. Field of the Invention

The present invention relates to a method and apparatus for searching for a fixed codebook used in a code excited linear prediction (CELP) speech codec.

2. Description of the Related Art

There are various ways of converting speech into a digital signal that can be easily transmitted. The conversion of speech into a digital signal and compression of the digital signal are performed by a vocoder, that is, a speech encoder. Vocoders are categorized into three types: a waveform codec, a source codec, and a hybrid codec. A code excited linear prediction (CELP) speech codec is a kind of a hybrid codec that uses a compression algorithm used during speech encoding at a low bit speed. The CELP speech codec is capable of generating a high-quality speech signal at a bit rate of transmission lower than 16 kbps.

To compress a speech signal, the CELP speech codec makes a codebook using different white Gaussian noises and transmits an index, instead of the speech signal, which corresponds to an optimum white Gaussian noise stream. In the optimum white Gaussian noise stream, an error between an input speech signal and synthesis voice is minimized. The channel capacity of a gateway for use in a Voice over Internet Protocol (VoIP) depends largely on the complexity of a speech codec. In turn, the complexity of the speech codec, which uses the CELP technique, is determined by the type of a fixed codebook search method.

FIG. 1 is a table illustrating the structure of a G.729 speech codec. As shown in FIG. 1, pulses $i_0$, $i_1$, $i_2$, and $i_3$ are generated on tracks #0, #1, #2, and #3, respectively, each pulse having amplitude +1 or −1. Pulse position indexes of track #0 are 0, 5, 10, . . . , and 35; pulse position indexes of track #1 are 1, 6, 11, . . . , 36; pulse position indexes of track #2 are 2, 7, 12, . . . , 37; and pulse position indexes of track #3 are 3, 8, 13, . . . , 39. Searching for a fixed codebook is to detect an optimum pulse position of each of tracks #0 through #3.

A full search method, which is included in the fixed codebook search method, detects a fixed codebook at every possible pulse positions. Thus, good-quality speech can be obtained but the amount of calculation is large. For this reason, much time is spent on searching for the fixed codebook and the channel capacity of a gateway becomes insufficient.

A focused search method, which is also included in the fixed codebook search method, predetermines a threshold related to pulse positions on a higher-rank track, compares all combinations for detecting the pulse positions with the threshold, and excludes the least possible the combinations. Compared to the full search method, the focused search method is less complex and requires a relatively low-amount of calculation. Thus, the quality of sound is lower than that obtained using the full search method.

A depth-first tree search method, which is also included in the fixed codebook search method, sequentially and continuously detects pulse positions for every two tracks. In this method, several candidate pulse positions are selected on one of two tracks using a correlation value between the two tracks, and the detection is performed on the other track, thereby largely reducing the amount of computation and maintaining search complexity. As compared to the full search method and the focused search method, the amount of computation can be greatly reduced but the quality of sound is lower than the quality of sound obtained using the depth-first tree search method.

The above search methods, which are different types of the fixed codebook search method, are applicable only to particular-type speech codecs. Accordingly, it is difficult to adjust the quality of sound and the amount of computation in consideration of the number of users who access a gateway.

SUMMARY OF THE INVENTION

The present invention provides a combined, fixed codebook searching method in which the full search method is used to increase the quality of sound when the number of gateway users is small and the focused search method and the depth-first tree search method are used to increase the channel capacity of the gateway otherwise, thereby adjusting either the quality of sound or the channel capacity depending on the number of the gateway users.

According to an aspect of the present invention, there is provided a combined, fixed codebook searching method used in a code excited linear prediction (CELP) speech codec, the method including searching for a fixed codebook using a full search method that searches for the fixed codebook at all pulse positions; selecting a fixed codebook searching method by counting the number of users who are accessing a gateway, comparing the number of users with a predetermined threshold, and selecting a proper fixed codebook searching method based on the result of comparison; searching for the fixed codebook using the selected fixed codebook searching method; and checking whether the search for the fixed codebook is complete for all tracks of the CELP speech codec, terminating a routine of searching for the fixed codebook when it is determined the search is complete for all the tracks, and selecting a fixed codebook searching method again in consideration of the number of gateway users when there remains a track to be searched for.

According to another aspect of the present invention, there is provided a combined, fixed codebook searching apparatus used in a CELP speech codec, the apparatus comprising a full-search processor that searches for a fixed codebook using the full search method that searches for the fixed codebook at all pulse positions; a search method selector that counts the number of gateway users who are accessing a gateway, compares the number of gateway users with a predetermined set value, and selects a fixed codebook search method based on the result of comparison; and a fixed codebook search processor that searches for the fixed codebook using the selected fixed codebook search method selected.

BRIEF DESCRIPTION OF THE DRAWINGS

The above and other aspects and advantages of the present invention will become more apparent by describing in detail preferred embodiments thereof with reference to the attached drawings in which:

FIG. 1 is a table illustrating a structure of a fixed codebook used in a G.729 speech codec;

DETAILED DESCRIPTION OF THE INVENTION

Hereinafter, preferred embodiments of the present invention will be described in detail with reference to the accompanying drawings.

A fixed codebook search is to search for a pulse position $m_i$ that satisfies the following equation:

$$\max\left|\frac{\left\{\sum_{i=0}^{M-1}\text{sign}\{b(m_i)\}d(m_i)\right\}^2}{\sum_{i=0}^{M-1}\phi(m_i,m_i)+2\sum_{i=0}^{M-1}\sum_{j=i+1}^{M-1}\text{sign}\{b(m_i)\}\text{sign}\{d(m_j)\}\phi(m_i,m_j)}\right|, \quad (1)$$

wherein M denotes the number of pulse positions per track, b(n) denotes a pulse-position likelihood-estimate vector, and d and ϕ can be expressed using the following equations, respectively:

$$d(n)=\sum_{i=n}^{39}x_2(i)h(i-n),\ i=0,\ \ldots,39, \quad (2)$$

$$\phi(i,j)=\sum_{n=j}^{39}h(n-i)h(n-j),\ i=0,\ \ldots,39,\ j=1,\ \ldots,39, \quad (3)$$

wherein $x_2(n)$ denotes a signal on which the fixed codebook search is performed, and h(n) denotes an impulse response of a low-pass (LP) synthetic filter.

In Equation (1), b(n) can assume three shapes as defined in the following equation:

$$b(n)=\left|\begin{array}{c} r_{LTP}(n), \\ dn, \\ \dfrac{r_{LTP}(n)}{\sqrt{\sum_{i=0}^{N-1}r_{LTP}(i)r_{LTP}(i)}}+\dfrac{d(n)}{\sqrt{\sum_{i=0}^{N-1}d(i)d(i)}} \end{array}\right|, \quad (4)$$

wherein $r_{LTP}(n)$ denotes a pitch residual signal and N denotes the length of a sub frame. Since the quality of sound depends on the type of pulse-position likelihood-estimate vector, it is important to select a proper pulse-position likelihood-estimate vector during searching for a fixed codebook in a speech codec.

Figure 2:
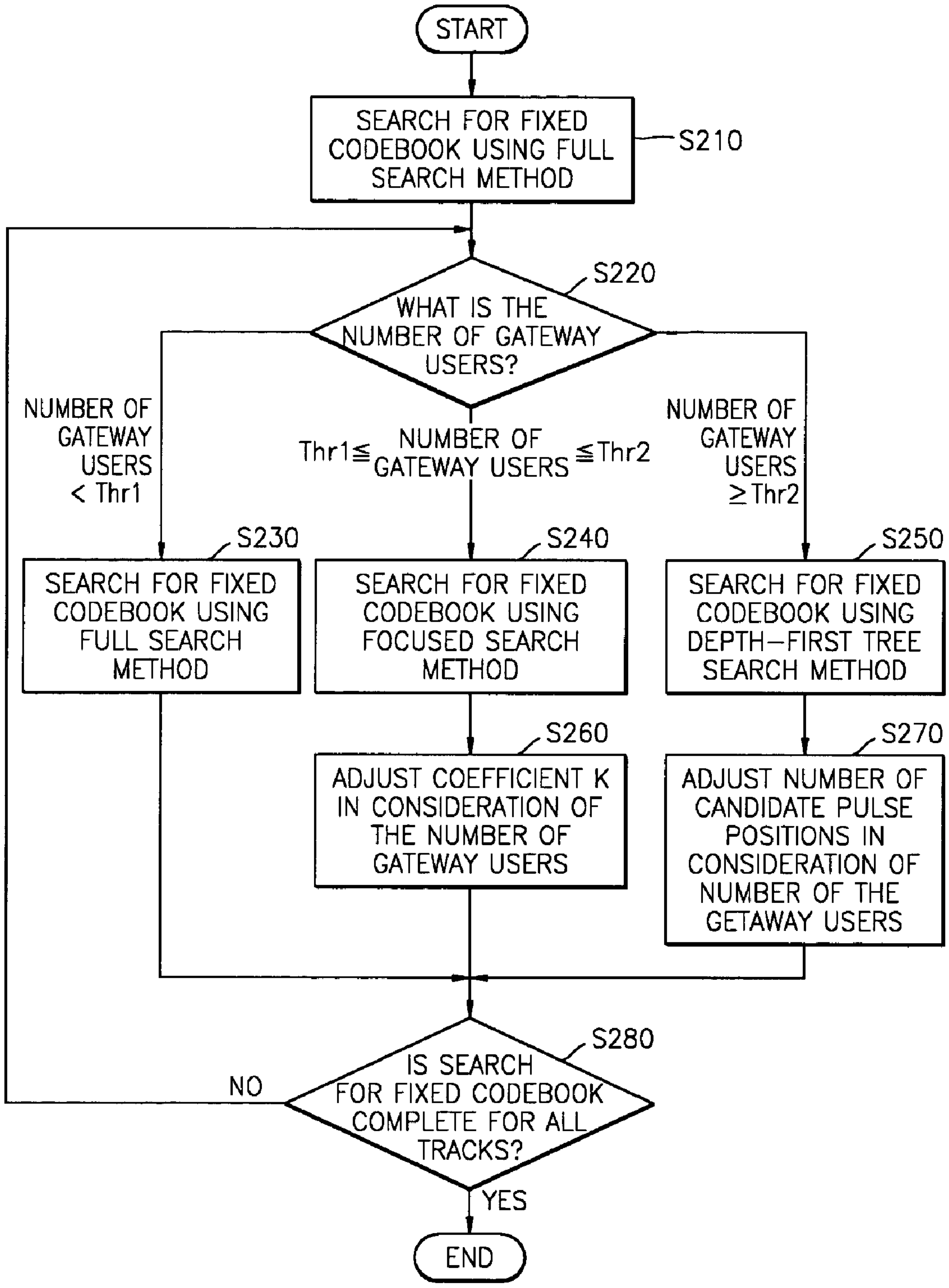
FIG. 2 is a flowchart illustrating a method of searching for a fixed codebook in a speech codec used in a gateway, according to a preferred embodiment of the present invention.

FIG. 2 is a flowchart illustrating a method of searching for a fixed codebook in a speech codec used in a gateway, according to a preferred embodiment of the present invention.

Referring to FIG. 2, a fixed codebook is searched for using the full search method in action 210. The full search method allows detection of a pulse position satisfying Equation (1) from all pulse positions satisfying a fixed codebook structure. Using the full search method, it is possible to obtain high-quality sound but the amount of computation is large. Thus, since high-level processing capability is required, the channel capacity of the gateway is reduced.

In action 220, the number of gateway users who are accessing the gateway is counted, the gateway users' number is compared to a predetermined set value Thr1 or/and a predetermined set value Thr2, and an appropriate fixed codebook search method is selected based on the result of comparison.

In action 230, if the number of the gateway users is smaller than predetermined set value Thr1, the full search method is selected to search for a fixed codebook, thereby enhancing the sound quality. In action 240, if the number of the gateway users is the same as or larger than predetermined set value Thr1 and is smaller than or the same as the predetermined set value Thr2, the focused search method is selected, thereby increasing the channel capacity of the gateway although the quality of sound is lower than that of the sound obtained using the full search method. In action 250, if the number of the gateway users is the same as or larger than predetermined set value Thr2, the depth-first tree search method is selected to search for a fixed codebook, thereby greatly increasing the channel capacity of the gateway although the quality of sound is lower than that of the sound obtained using the full search method or the focused search method.

More specifically, in action 240 where the fixed codebook is searched for using the focused search method, a threshold is determined using correlation values between all pulse positions on an upper-rank track, a sum of the correlation values between combinations of the pulse positions on the upper-rank track is compared with the threshold; and pulse positions of a last track are searched for when the sum of the correlation is larger than the threshold. As compared to the full search method, the quality of sound is slightly lower, but the amount of computation is reduced when a fixed codebook is searched using the focused search method. As a result, the channel capacity of the gateway is more than that of the gateway when using the full search method. Here, the threshold $C_{thr}$ can be expressed as follows:

$$C_{thr}=C_{av}+K(C_{mzx}-C_{av}) \quad (5),$$

wherein K denotes a constant that is used to adjust the number of combinations of pulse positions, the value of the constant K ranging between 0 and 1, and $C_{max}$ and $C_{av}$ denote a maximum correlation value and an average correlation value related to all pulse positions of an upper-rank track, respectively. $C_{max}$ and $C_{av}$ can be expressed as follows:

$$C_{\max}=\sum_{m=0}^{T-2}\text{Maxsign}\{b(Tn+m)\}d(Tn+m), \quad (6)$$

$$C_{av}=\frac{1}{M}\left\{\sum_{m=0}^{T-2}\sum_{n=0}^{M-1}\text{sign}\{b(Tn+m)\}d(Tn+m)\right\}, \quad (7)$$

wherein T denotes the number of tracks in a sub frame. The coefficient K is a factor that changes the amount of computation and the channel capacity of the gateway. Therefore, the coefficient K must be determined based on the processing capability of the gateway.

In action 250 where a fixed codebook is searched for using the depth-first tree search method, pulse positions are sequentially and continuously searched for every two tracks. Several candidate pulse positions are searched for and selected on one of the two tracks using the pulse-position likelihood-estimate vector |b(n)|, and then, the search of pulse positions is also performed on the other track. The amount of computation required by the depth-first tree search method is still less than that of computation required by the full search method or the focused search method. Therefore, the channel capacity of the gateway can be increased considerably.

In action 260, the coefficient K is adjusted based on the number of gateway users who are accessing the gateway after searching for the fixed codebook using the focused search method. The more the number of the gateway users, the greater the coefficient K. Thus, the channel capacity of the gateway is increased by reducing the amount of computation.

In action 270, the number of candidate pulse positions is adjusted based on the number of the gateway users after searching for the fixed codebook using the depth-first tree search method. If the number of the gateway users increases, the number of the candidate pulse positions decreases. In this case, the channel capacity of the gateway can also be increased by reducing the amount of computation.

In action 280, it is checked whether the search for the fixed codebook is complete with respect to all tracks. If the search is complete, a routine of searching the fixed codebook is terminated. If there is a track(s) to be searched for, actions 220 through 280 are repeated.

Figure 3:
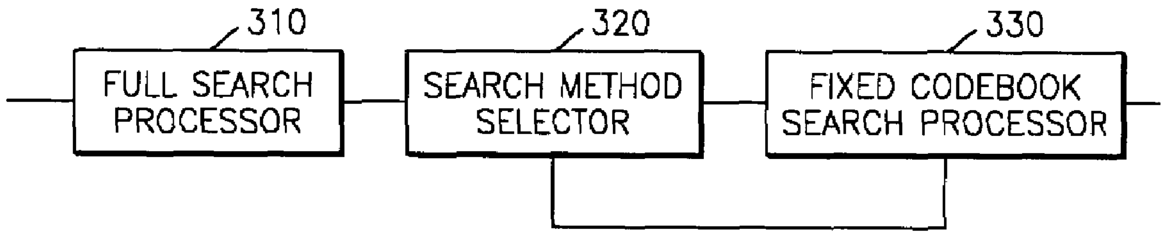
FIG. 3 is a block diagram illustrating a structure of a fixed codebook searching apparatus used in a code excited linear prediction (CELP) speech codec, according to a preferred embodiment of the present invention.

FIG. 3 is a block diagram illustrating a structure of a combined, fixed codebook searching apparatus used in a CELP speech codec, according to a preferred embodiment of the present invention.

Referring to FIG. 3, the codebook searching apparatus includes a full-search processor 310, a search method selector 320, and a fixed codebook search processor 330.

The full-search processor 310 searches for a fixed codebook at all pulse positions using the full search method. The search method selector 320 counts the number of users who are accessing a gateway, compares the number of users with a predetermined set value, and selects a fixed codebook searching method based on the result of comparison. For instance, when the number of users is smaller than a predetermined first set value, the full search method is selected. When the number of users is the same as or larger than the predetermined first set value and is smaller than or the same as a second set value, the focused search method is selected. When the number of users is the same as or larger than the predetermined second set value, the depth-first tree search method is selected.

The fixed codebook search processor 330 searches for the fixed codebook using a selected fixed codebook searching method. That is, the fixed codebook search processor 330 searches for the fixed codebook using one of the full search method, the focused search method, and the depth-first tree search method, which is selected by the search method selector 320. If the search for the fixed codebook is not complete for all frames, the number of users who are accessing the gateway is counted again, a fixed codebook searching method is selected, and the fixed codebook search is performed using the selected method.

The present invention can be embodied as a computer readable code on a computer readable medium. Here, the computer readable medium may be any medium capable of storing data that can be read by a computer system, e.g., a read-only memory (ROM), a random access memory (RAM), a compact disc (CD)-ROM, a magnetic tape, a floppy disk, an optical data storage device, and so on.

While this invention has been particularly shown and described with reference to preferred embodiments thereof, it will be understood by those skilled in the art that various changes in form and details may be made therein without departing from the spirit and scope of the invention as defined by the appended claims.

As described above, according to the present invention, it is possible to effectively select and adjust either the quality of sound or the channel capacity of a gateway by appropriately selecting a fixed codebook searching method in consideration of the number of users who are accessing the gateway. For instance, the full search method is selected to enhance the quality of sound when the number of gateway users is small, and the focused search method or the depth-first tree search method is selected to increase the channel capacity of the gateway when the number of gateway users increases.

What is claimed is:

1. A combined, fixed codebook searching method used in a code excited linear prediction (CELP) speech codec, the method comprising:

searching for a fixed codebook using a full search method that searches for the fixed codebook at all pulse positions;

selecting a fixed codebook searching method by counting the number of users who are accessing a gateway, comparing the number of users with a predetermined threshold, and selecting a proper fixed codebook searching method based on the result of comparison;

searching for the fixed codebook using the selected fixed codebook searching method;

and checking whether the search for the fixed codebook is complete for all tracks of the CELP speech codec, terminating a routine of searching for the fixed codebook when it is determined the search is complete for all the tracks, and selecting a fixed codebook searching method again in consideration of the number of gateway users when there remains a track to be searched for, wherein after said search finds the fixed codebook, using the found fixed codebook as an input to the CELP speech codec.

2. The method of claim 1, wherein during selecting a fixed codebook searching method, the full search method is selected when the number of gateway users is smaller than a predetermined first threshold, a focused search method is selected when the number of gateway users is the same as or larger than the predetermined first threshold and is smaller than or the same as a predetermined second threshold, and a depth-first tree search method is selected when the number of gateway users is the same as or larger than the predetermined second threshold.

3. The method of claim 1, wherein during searching for a fixed codebook using a selected fixed codebook searching method, when the focused search method is selected, a threshold is predetermined using the correlation between all pulse positions of an upper-rank track, a sum of combinations of all the pulse positions of the upper-rank track is compared with the threshold, and pulse positions of a last track are searched for only when the sum is larger than the threshold.

4. The method of claim 3, wherein the threshold is computed by subtracting an average correlation value $C_{av}$ at all pulse positions of the upper-rank track from a maximum correlation value $C_{max}$, multiplying the result of subtraction by a predetermined coefficient, and combining the result of multiplication and the average correlation value $C_{av}$.

5. The method of claim 4, wherein the predetermined coefficient is a constant that adjusts the number of combinations of pulse positions and has a value ranging between 0 and 1, and the maximum correlation value $C_{max}$ and the average correlation value $C_{av}$ are expressed using the following equations, respectively;

$$C_{\max} = \sum_{m=0}^{T-2} \text{Max}\,\text{sign}\{b(Tn+m)\}d(Tn+m),$$

$$C_{av} = \frac{1}{M}\left\{\sum_{m=0}^{T-2}\sum_{n=0}^{M-1} \text{sign}\{b(Tn+m)\}d(Tn+m)\right\},$$

wherein T denotes the number of tracks in a sub frame, M denotes the number of pulse positions per track, and b denotes a pulse-position likelihood-estimate vector, d denotes a correlation signal, m denotes the $m^{th}$ track number where $0 \leqq m < T$, and n denotes the $n^{th}$ pulse position $0 \leqq n < M$.

6. The method of claim 4, wherein the predetermined coefficient is increased when the number of gateway users who are accessing the gateway increases, and is reduced when the number of gateway users decreases.

7. The method of claim 1, during searching for a fixed codebook using a selected fixed codebook searching method, when the focused search method is selected, the fixed codebook is searched using the focused search method, and the coefficient K, which adjusts the number of combinations of pulse positions, is adjusted in consideration of the number of gateway users.

8. The method of claim 1, wherein during searching for a fixed codebook using a selected fixed codebook searching method, when the depth-first tree search method is selected, pulse positions are sequentially, continuously searched for every two tracks, wherein several candidate pulse positions are selected in one of two tracks using an absolute value of the pulse-position likelihood-estimate vector and pulse positions of the other track are searched for.

9. The method of claim 8, wherein the pulse-position likelihood-estimate vector is expressed using the following equation:

$$b(n) = \left| \begin{array}{c} r_{LTP}(n), \\ dn, \\ \dfrac{r_{LTP}(n)}{\sqrt{\sum_{i=0}^{N-1} r_{LTP}(i) r_{LTP}(i)}} + \dfrac{d(n)}{\sqrt{\sum_{i=0}^{N-1} d(i)d(i)}} \end{array} \right|$$

wherein $r_{LTP}(n)$ denotes a pitch residual signal and N denotes the length of a sub frame and d denotes a correlation signal.

10. The method of claim 1, wherein during searching for a fixed codebook using a selected fixed codebook searching method, when the depth-first tree search method is selected, the fixed codebook is searched for using the depth-first tree search method, and the number of candidate pulse positions is reduced when the number of gateway users who are accessing the gateway increases.

11. A computer-readable recording medium on which a program to execute the method of claim 1 using a computer is recorded.

12. A combined, fixed codebook searching apparatus used in a CELP speech codec, the apparatus comprising:

a full-search processor that searches for a fixed codebook using the full search method that searches for the fixed codebook at all pulse positions;

a search method selector that counts the number of gateway users who are accessing a gateway, compares the number of gateway users with a predetermined set value, and selects a fixed codebook search method based on the result of comparison; and a fixed codebook search processor that searches for the fixed codebook using the selected fixed codebook search method selected.

13. The apparatus of claim 12, wherein the search method selector selects the full search method when the number of gateway users is smaller than a predetermined first set value, selects the focused search method when the number of gateway users is the same as or larger than the predetermined first set value and is smaller than or the same as a predetermined second set value, and selects the depth-first tree search method when the number of gateway users is the same as or larger than the predetermined second set value.

14. The apparatus of claim 12, wherein the fixed codebook searching processor searches for the fixed codebook using one of the full search method, the focused search method, and the depth-first tree search method, based on an output of the search method selector.

* * * * *